(12) United States Patent
Masui

(10) Patent No.: US 11,909,339 B2
(45) Date of Patent: Feb. 20, 2024

(54) RESONANCE SUPPRESSION CONTROL DEVICE

(71) Applicant: SINFONIA TECHNOLOGY CO., LTD., Tokyo (JP)

(72) Inventor: Yoji Masui, Tokyo (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 0 days.

(21) Appl. No.: 17/798,110

(22) PCT Filed: Feb. 25, 2021

(86) PCT No.: PCT/JP2021/007217
§ 371 (c)(1),
(2) Date: Aug. 8, 2022

(87) PCT Pub. No.: WO2021/177146
PCT Pub. Date: Sep. 10, 2021

(65) Prior Publication Data
US 2023/0074727 A1  Mar. 9, 2023

(30) Foreign Application Priority Data
Mar. 2, 2020  (JP) .............................. 2020-034709

(51) Int. Cl.
*G05B 5/01* (2006.01)
*H02P 23/04* (2006.01)
*H02P 29/50* (2016.01)

(52) U.S. Cl.
CPC .............. *H02P 23/04* (2013.01); *H02P 29/50* (2016.02)

(58) Field of Classification Search
CPC .............. H02P 23/04; H02P 29/50; H02P 6/10
See application file for complete search history.

(56) References Cited

U.S. PATENT DOCUMENTS

| 5,828,014 A | 10/1998 | Goto et al. |
| 5,990,645 A | 11/1999 | Nakamura et al. |
| 2005/0084115 A1* | 4/2005 | Enamito .......... G10K 11/17854 381/71.7 |

FOREIGN PATENT DOCUMENTS

| CN | 1172762 A | 2/1998 |
| GB | 2313928 A | 12/1997 |

(Continued)

OTHER PUBLICATIONS

International Preliminary Report on Patentability and Written Opinion of the International Searching Authority (Forms PCT/IB/338, PCT/IB/373, PCT/ISA/237 and PCT/IB/236) dated Sep. 15, 2022, by the International Bureau of WIPO, in corresponding International Application No. PCT/JP2021/007217 with English Translation. (10 pages).

(Continued)

*Primary Examiner* — Karen Masih
(74) *Attorney, Agent, or Firm* — BUCHANAN INGERSOLL & ROONEY PC

(57) ABSTRACT

In a resonance suppression control device that controls suppression of vibrations in a resonance frequency in each vibration mode of a control target having a plurality of vibration modes, a configuration that is simple, and can suppress vibrations in a resonance frequency in the plurality of vibration modes is provided. A control device is a resonance suppression control device that controls suppression of vibrations in a resonance frequency in each vibration mode of a control target having a plurality of vibration modes. The control device includes a plurality of feedback loops that provide negative feedback of output of the control target corresponding to the plurality of vibration modes to an input side. The plurality of feedback loops respectively include band-pass filters that extract one or more vibration modes from the plurality of vibration modes, phase com- (Continued)

pensators, and amplitude adjusters. The band-pass filters and the phase compensators function as differentiators.

4 Claims, 6 Drawing Sheets

(56) References Cited

FOREIGN PATENT DOCUMENTS

| | | | |
|---|---|---|---|
| JP | H1053378 A | | 2/1998 |
| JP | H10241963 A | * | 9/1998 |
| JP | 2017182178 A | | 10/2017 |
| JP | 2019095903 A | | 6/2019 |
| KR | 20210022696 A | * | 3/2021 |
| WO | 9707590 A1 | | 2/1997 |

OTHER PUBLICATIONS

International Search Report (PCT/ISA/210) with translation and Written Opinion (PCT/ISA/237) dated May 18, 2021, by the Japanese Patent Office as the International Searching Authority for International Application No. PCT/JP2021/007217. (9 pages).

Office Action (Notice of Reasons for Refusal) dated May 30, 2023, by the Japanese Patent Office in corresponding Japanese Patent Application No. 2020-034709, and an English Translation of the Office Action. (4 pages).

Decision to Grant a Patent dated Aug. 8, 2023, by the Japanese Patent Office in corresponding Japanese Patent Application No. 2020-034709, with English Translation (5 pages).

* cited by examiner

RESONANCE SUPPRESSION CONTROL DEVICE

TECHNICAL FIELD

The present teaching relates to a resonance suppression control device that suppresses vibrations in a resonance frequency of a control target.

BACKGROUND ART

A known resonance suppression control device suppresses vibrations in a resonance frequency of a control target. As an example of such a resonance suppression control device, Patent Document 1, for example, discloses a resonance suppression control device that controls a transmission system having two or more vibration modes.

The resonance suppression control device includes a feedback loop that provides negative feedback of an output value appearing in an output part of the control target to an input part of the control target. This feedback loop includes a filter that extracts one or more of vibration modes of the control target and a differentiator for adjusting an attenuation ratio that adjusts each attenuation ratio of the one or more vibration modes.

Accordingly, even in a case where a plurality of vibration modes is present, resonance suppression can be effectively performed on the extracted vibration modes, and disturbance can be well suppressed.

CITATION LIST

Patent Document

Japanese Patent Application Publication No. 2017-182178

SUMMARY OF INVENTION

Technical Problem

The resonance suppression control device disclosed in Patent Document 1 includes the filter and the differentiator in the feedback loop. The resonance suppression control device having the configuration described above, however, needs replacement to a proper transfer function corresponding to an inverse model in mounting on a device. In this case, if a difference occurs between performance of the replaced transfer function and performance of the inverse model, vibrations of the control target can be insufficiently suppressed in some cases.

It is therefore an object of the present teaching to provide, in a resonance suppression control device that controls suppression of vibrations in a resonance frequency in each vibration mode of a control target having a plurality of vibration modes, a configuration that is simple, can be easy mounted, and can suppress vibrations in the resonance frequency of each of the plurality of vibration mode.

Solution to Problem

A resonance suppression control device according to one embodiment of the present teaching is a resonance suppression control device configured to control suppression of vibrations in a resonance frequency of a control target. The resonance suppression control device includes a plurality of feedback loops configured to provide negative feedback of an output of the control target to an input side in accordance with a plurality of vibration modes of the control target. Each of the plurality of feedback loops includes a band-pass filter, a phase compensator, and an amplitude adjuster, the band-pass filter being configured to extract one or more vibration modes from the plurality of vibration modes. The band-pass filter and the phase compensator function as differentiators. (First configuration)

Since the band-pass filter and the phase compensator function as differentiators as described above, a simple configuration of the feedback loops can suppress vibrations in a resonance frequency of each vibration mode of the control target. In addition, since the resonance suppression control device includes the plurality of feedback loops, the resonance suppression control device can suppress vibrations in the resonance frequency in each of the plurality of vibration modes of the control target.

Thus, with the configuration described above, in the resonance suppression control device that controls suppression of vibrations in the resonance frequency in each vibration mode of the control target having the plurality of vibration modes, a configuration that is simple, can be easily mounted, and can suppress vibrations in the resonance frequency of each of the plurality of vibration mode can be obtained.

In the first configuration, at least one of the band-pass filter, the phase compensator, or the amplitude adjuster has a parameter that is variable in accordance with the resonance frequency. (Second configuration)

Accordingly, even in a case where the resonance frequency in the vibration mode of the control target changes, the parameter of at least one of the band-pass filter, the phase compensator, or the amplitude adjuster can be changed in accordance with the change. Thus, even in the case where the resonance frequency in the vibration mode of the control target changes, vibrations can be suppressed by using the resonance frequency changed in the vibration mode of the control target.

In the first or the second configuration, the resonance suppression control device further includes a resonance frequency estimator configured to estimate a resonance frequency of each of the plurality of vibration modes. At least one of the band-pass filter, the phase compensator, or the amplitude adjuster includes a parameter that is variable in accordance with the resonance frequency estimated by the resonance frequency estimator. (Third configuration)

Accordingly, the parameter of at least one of the band-pass filter, the phase compensator, or the amplitude adjuster can be changed in accordance with an estimation result of the resonance frequency in each vibration mode of the control target. Thus, even in the case where the resonance frequency in each vibration mode of the control target changes, vibrations can be suppressed by using the resonance frequency changed in each vibration mode of the control target.

In the second or third configuration, the band-pass filter is configured to change a frequency in a pass band in accordance with the resonance frequency. The phase compensator is configured to change a phase of a predetermined frequency in accordance with the resonance frequency. The amplitude adjuster is configured to change a gain of the predetermined frequency in accordance with the resonance frequency. (Fourth configuration)

In this manner, the second or third configuration can be obtained. Thus, even in the case where the resonance frequency in each vibration mode of the control target changes, vibrations can be suppressed by using the resonance frequency changed in the vibration mode of the control target.

The predetermined frequency is a frequency of a signal that was generated in the feedback loop and has passed through the band-pass filter.

Advantageous Effects of Invention

The resonance suppression control device according to one embodiment of the present teaching includes the plurality of feedback loops that provides negative feedback of output of the control target corresponding to the plurality of vibration modes to the input side. Each of the plurality of feedback loops includes the band-pass filter that extracts one or more of the plurality of vibration modes, the phase compensator, and the amplitude adjuster. The band-pass filter and the phase compensator function as differentiators. In this manner, in the resonance suppression control device that controls suppression of vibrations in a resonance frequency in each vibration mode of the control target having the plurality of vibration modes, a configuration that is simple, can be easily mounted, and can suppress vibrations by using a resonance frequency in each of the plurality of vibration modes can be obtained.

DESCRIPTION OF EMBODIMENT

Figure 1:
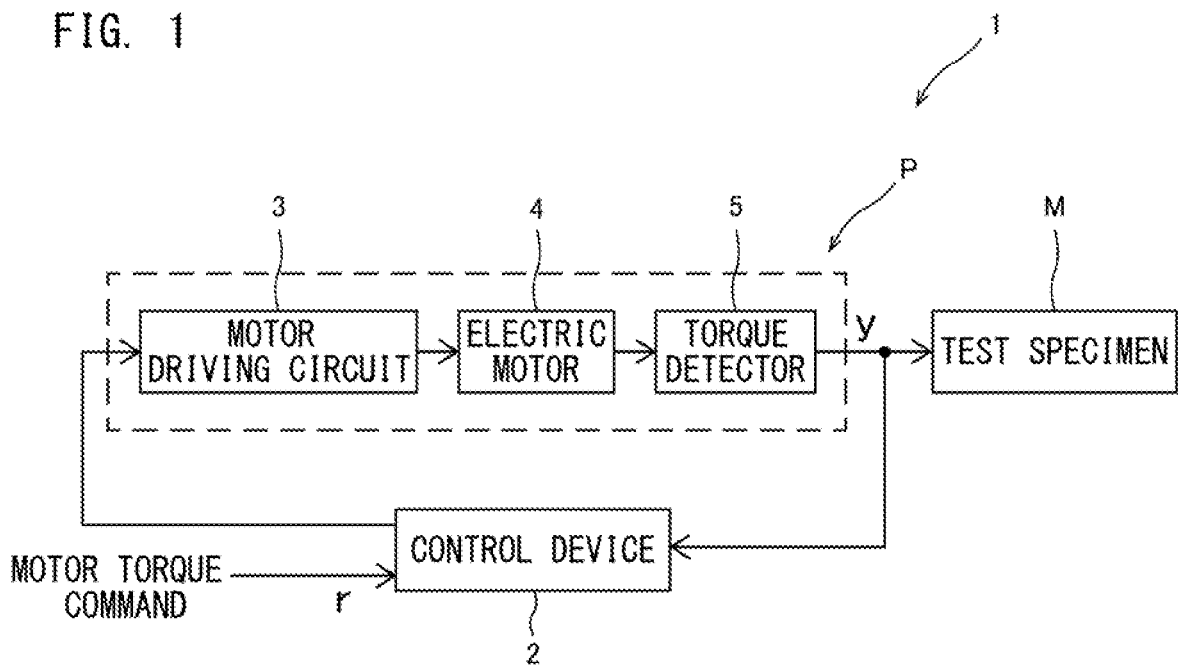
FIG. 1 is a functional block diagram illustrating a schematic configuration of a test device including a control device according to a first embodiment.

Embodiments of the present teaching will be described hereinafter in detail with reference to the drawings. In the drawings, the same or corresponding parts are denoted by the same reference characters, and description thereof will not be repeated.

First Embodiment (Overall Configuration)

FIG. 1 is a functional block diagram illustrating a schematic configuration of a test device 1 including a resonance suppression control device according to a first embodiment of the present teaching. The test device 1 is a test device for inspecting characteristics of a test specimen M such as a motor of an automobile. The test specimen M to be inspected by the test device 1 may be a rotary body other than the motor.

Specifically, the test device 1 includes a control device 2 (resonance suppression control device), a motor driving circuit 3, an electric motor 4, and a torque detector 5.

The control device 2 generates a driving command to the motor driving circuit 3 by using a motor torque command r as an input command and a feedback value described later. The control device 2 includes a plurality of feedback loops 11 and 12 that provide negative feedback to the motor torque command r by using an output value of the torque detector 5 (see FIG. 2). A configuration in which the control device 2 generates the driving command is similar to a conventional configuration, and thus, a configuration of the control device 2 will not be described in detail. Configurations of the feedback loops 11 and 12 will be described later.

Although not specifically shown, the motor driving circuit 3 includes a plurality of switching devices. When the plurality of switching devices is driven based on the driving command, the motor driving circuit 3 thereby supplies electric power to an unillustrated coil of the electric motor 4.

The electric motor 4 includes an unillustrated rotor and an unillustrated stator. When electric power is supplied from the motor driving circuit 3 to the coil of the stator, the rotor thereby rotates with respect to the stator. The rotor is coupled to the test specimen M through an unillustrated intermediate shaft to be rotatable together with the test specimen M. Accordingly, rotation of the rotor causes the electric motor 4 to output a torque to the test specimen M. A configuration of the electric motor 4 is similar to a configuration of a typical motor, and thus, will not be described in detail.

The torque detector 5 is provided to the intermediate shaft connecting the electric motor 4 and the test specimen M to each other. The torque detector 5 detects a torque output from the electric motor 4. An output value of the torque detected by the torque detector 5 is input to the control device 2 as input values to the feedback loops 11 and 12. That is, the output value of the torque detector 5 is used for feedback control. A configuration of the torque detector 5 is similar to a conventional configuration, and thus, the torque detector 5 will not be described in detail.

In the thus-configured test device 1, mechanical resonance (which will be simply referred to as resonance) occurs during rotation of the electric motor 4 by stiffness of a shaft system including the electric motor 4, the torque detector 5, and the test specimen M. In a case where the resonance occurs in a measurement range of frequency in the inspection of the test specimen M, the torque detector 5 detects a torque (e.g., shaft torque) in which a vibration component of the resonance is added to the output torque of the electric motor 4. Thus, it is required to eliminate the vibration component of the resonance. In a case where a disturbance is applied to the shaft system, the value of the shaft torque detected by the torque detector 5 tends to vary significantly.

Figure 2:
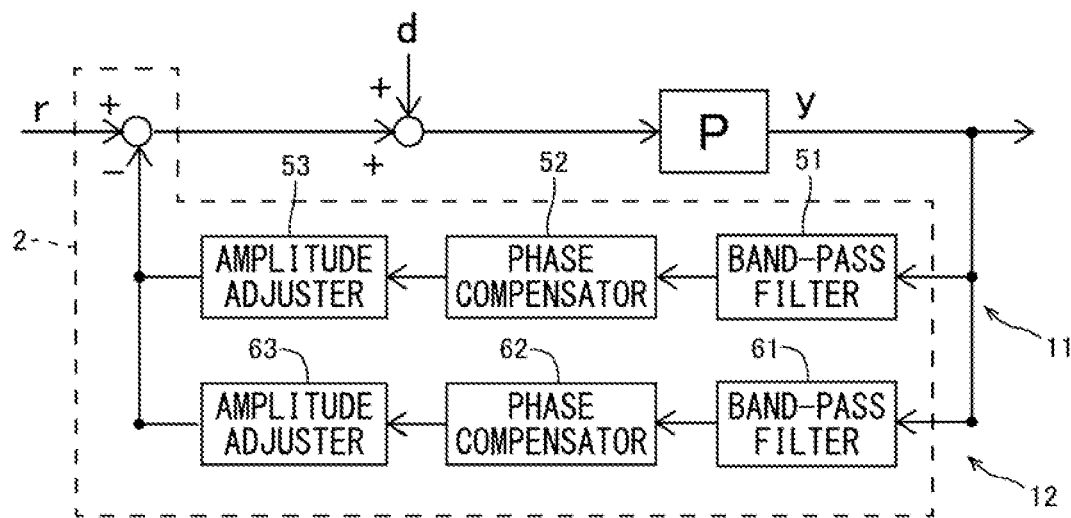
FIG. 2 is a functional block diagram illustrating a schematic configuration of the control device.

On the other hand, in this embodiment, the control device 2 includes the plurality of feedback loops 11 and 12 that provide feedback of the output value of the torque detector 5 to the motor torque command r as an input command, as illustrated in FIG. 2. That is, the test device 1 according to this embodiment controls driving of the electric motor 4 by a control system including the control device 2, the motor driving circuit 3, the electric motor 4, and the torque detector 5 and not including the test specimen M.

In FIG. 2, r is a target value as a motor torque command, y is an output value of the torque detector 5, and d is a disturbance.

In FIG. 2, reference sign P is a control target, and in this embodiment, a control target P includes the motor driving circuit 3, the electric motor 4, and the torque detector 5. The control target P includes a range from the electric motor 4 to the torque detector 5 in the intermediate shaft connecting the electric motor 4 and the test specimen M to each other.

Each of the plurality of feedback loops 11 and 12 is a differential feedback system including a differentiating element. Each of the feedback loops 11 and 12 receives an output value of the torque detector 5. The feedback loop 11 includes a band-pass filter 51, a phase compensator 52, and an amplitude adjuster 53. The feedback loop 12 includes a band-pass filter 61, a phase compensator 62, and an amplitude adjuster 63.

The band-pass filter 51 of the feedback loop 11 has a configuration similar to that of the band-pass filter 61 of the feedback loop 12. The phase compensator 52 of the feedback loop 11 has a configuration similar to that of the phase compensator 62 of the feedback loop 12. The amplitude adjuster 53 of the feedback loop 11 has a configuration similar to that of the amplitude adjuster 63 of the feedback loop 12.

In the feedback loop 11 and the feedback loop 12, a band of a signal that passes through each loop in the output value of the torque detector 5 is different, which will be described later.

The band-pass filters 51 and 61 constitute a part of the differentiating element. The band-pass filters 51 and 61 also have a function similar to a high-pass filter in a conventional differentiator, and also have a function of a low-pass filter that cuts off high-frequency noise.

Figure 3:
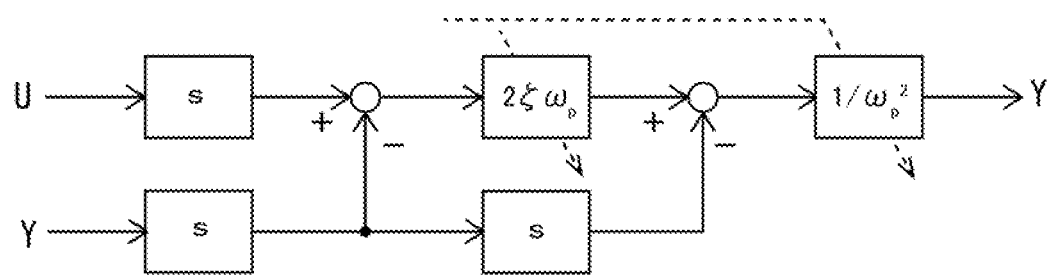
FIG. 3 is a functional block diagram illustrating band-pass filters for enabling change.

The band-pass filters 51 and 61 have transfer characteristics defined by Equation (1) below. When the transfer characteristics are expressed in a block diagram, a block diagram as illustrated in FIG. 3 is obtained.

$$\frac{Y}{U} = \frac{2\zeta\omega_p s}{s^2 + 2\zeta\omega_p s + \omega_p^2} \quad (1)$$

where Y is an output, U is an input, ωP is a center angular frequency, ζ is an attenuation ratio, and s is a differentiating element. FIG. 3 shows a continuous system, but in mounting, values one sampling before are used as Y and U at the input side in FIG. 3.

The phase compensators 52 and 62 constitute a part of the differentiating element. The phase compensators 52 and 62 have a function similar to that of phase adjustment in a conventional differentiator. The phase compensators 52 and 62 have both functions of phase lead compensation and phase lag compensation in generating a signal for suppressing vibrations caused by resonance (vibration suppressing signal). The phase compensators 52 and 62 can adjust a phase of the vibration suppressing signal to an intended phase as phase lead compensation or phase lag compensation.

In the manner described above, the phase compensators 52 and 62 can adjust the phase of the vibration suppressing signal to an intended phase so that the phase of the vibration suppressing signal can be easily set in the case of considering a phase of a dead time.

Figure 4:
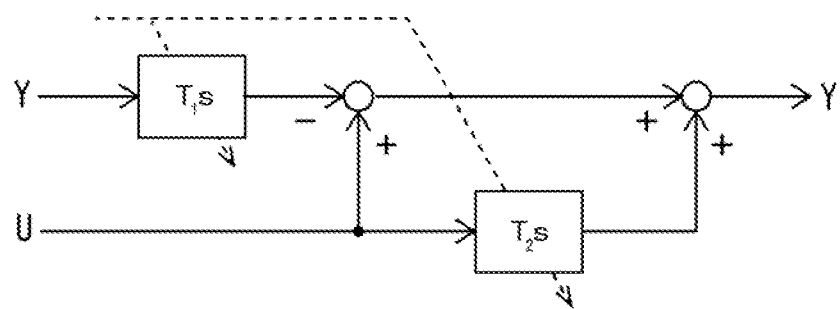
FIG. 4 is a functional block diagram illustrating phase compensators for enabling change.

The phase compensators 52 and 62 have transfer characteristics defined by Equation (2) below. When the transfer characteristics are expressed in a block diagram, a block diagram as illustrated in FIG. 4 is obtained.

$$\frac{Y}{U} = \frac{T_2 s + 1}{T_1 s + 1} \quad (2)$$

where Y is an output, U is an input, T1 and T2 are time constants, and s is a differentiating element. FIG. 4 shows a continuous system, but in mounting, values one sampling before are used as Y and U at the input side in FIG. 4.

The band-pass filter 51 and the phase compensator 52 constitute differentiating elements of the feedback loop 11. The band-pass filter 61 and the phase compensator 62 constitute differentiating elements of the feedback loop 12.

The amplitude adjusters 53 and 63 adjust a gain of the vibration suppressing signal. That is, the amplitude adjusters 53 and 63 adjust amplitude of the vibration suppressing signal.

With the configuration described above, in the feedback loop 11, a phase and an amplitude of a signal to be fed back are adjusted so that a vibration suppressing signal for suppressing vibrations caused by resonance is generated. Similarly, in the feedback loop 12, a phase and an amplitude of a signal to be fed back are also adjusted so that a vibration suppressing signal for suppressing vibrations caused by resonance is generated.

Each of the plurality of feedback loops 11 and 12 is configured to suppress vibrations in a resonance frequency in each vibration mode. The band-pass filters 51 and 61 in the plurality of feedback loops 11 and 12 are configured to allow signals in different bands to pass therethrough so as to enable extraction of different vibration modes.

In the plurality of feedback loops 11 and 12, the phase compensators 52 and 62 adjust the phase of the vibration suppressing signal so as to suppress vibrations in a resonance frequency of a vibration mode extracted by the band-pass filters 51 and 61 of the same feedback loops 11 and 12 as the phase compensators 52 and 62.

In the plurality of feedback loops 11 and 12, the amplitude adjusters 53 and 63 adjust the amplitude of the vibration suppressing signal so as to suppress vibrations in a resonance frequency in the vibration mode extracted by the band-pass filters 51 and 61 of the same feedback loops 11 and 12 as the amplitude adjusters 53 and 63.

Accordingly, the plurality of feedback loops 11 and 12 are used to suppress vibrations in the resonance frequency in each vibration mode. Consequently, it is possible to suppress vibrations in the resonance frequency in each vibration mode of the control target P having a plurality of vibration modes.

Advantages of the embodiment as described above were confirmed as follows.

Figure 5:
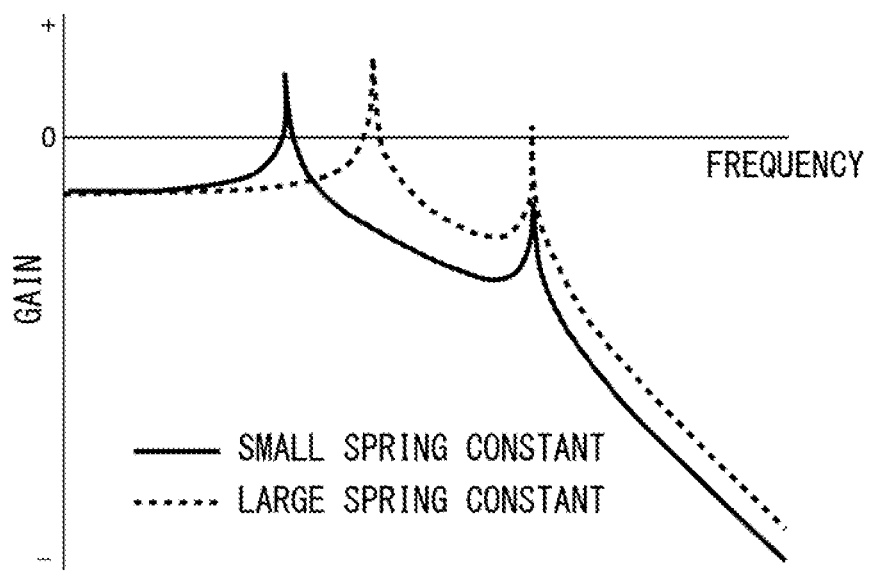
FIG. 5 is a graph showing frequency characteristics of a three-mass point model.

FIG. 5 shows frequency characteristics of a three-mass point model. The solid line represents a frequency characteristic with a small spring constant in the three-mass point model, and the broken line represents a frequency characteristic with a large spring constant in the three-mass point model. In this manner, with such different spring constants, different resonance frequencies and different gains thereof are obtained.

As a simulation model, a three-mass point model was created such that the spring constant is small from 0 seconds to 5 seconds, linearly changes from small to large from 5 seconds to 10 seconds, and is large from 10 seconds to 15 seconds. Then, a time response in a case where white noise was input to this model was obtained. With the time change as described above, it was additionally confirmed that a resonance frequency in the three-mass point model changed.

Figure 6:
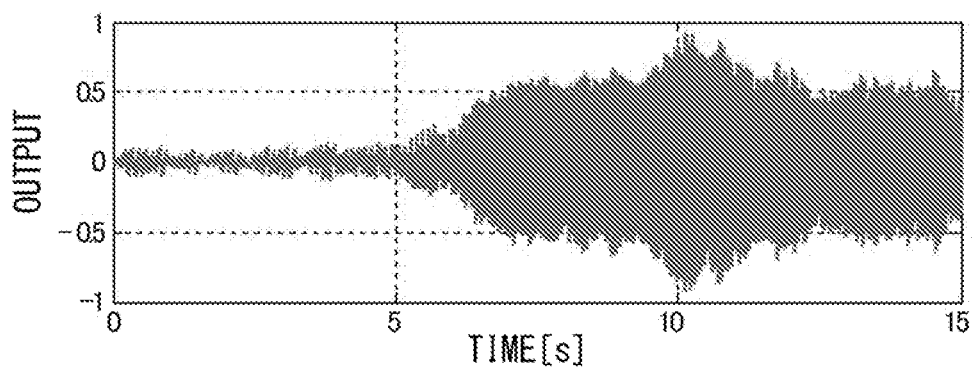
FIG. 6 shows a result of a time response in a case where no vibration suppression control is performed.

FIG. 6 is a graph showing an example of a time response in a case were no vibration suppression control as described in this embodiment is performed. As shown in FIG. 6, in the case where no vibration suppression control as described in this embodiment is performed, vibrations by resonance occurs.

Figure 7:
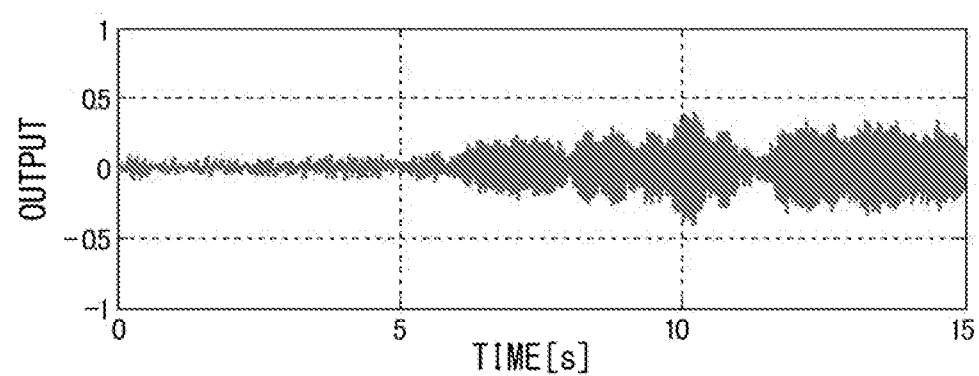
FIG. 7 shows a result of a time response in a case where vibration suppression control according to the first embodiment is performed.

FIG. 7 is a graph showing an example of a time response in a case where vibration suppression control of this embodiment is performed. As shown in FIG. 7, the vibration suppression control of this embodiment enables suppression of vibrations by resonance more effectively than the result shown in FIG. 6.

In this embodiment, the control device 2 includes the plurality of feedback loops 11 and 12 that provide negative feedback of output of the control target P corresponding to a plurality of vibration modes to the input side. The plurality of feedback loops 11 and 12 respectively include the band-pass filters 51 and 61 that extract one or more vibration modes from the plurality of vibration modes, the phase compensators 52 and 62, and the amplitude adjusters 53 and 63. The band-pass filters 51 and 61 and the phase compensators 52 and 62 function as differentiators.

In this manner, since the band-pass filters 51 and 61 and the phase compensators 52 and 62 function as differentiators, the simple configuration of the feedback loops 11 and 12 can suppress vibrations in the resonance frequency of each vibration mode of the control target P. In addition, since the control device 2 includes the plurality of feedback loops 11 and 12, vibrations in the resonance frequency of each of the plurality of vibration modes of the control target P can be suppressed.

Thus, with the configuration described above, in the control device 2 that controls suppression of vibrations in the resonance frequency of each vibration mode to the control target P having a plurality of vibration modes, a configuration that is simple, can be easily mounted, and can suppress vibrations in the resonance frequency of each of the plurality of vibration modes is obtained.

Second Embodiment

Figure 8:
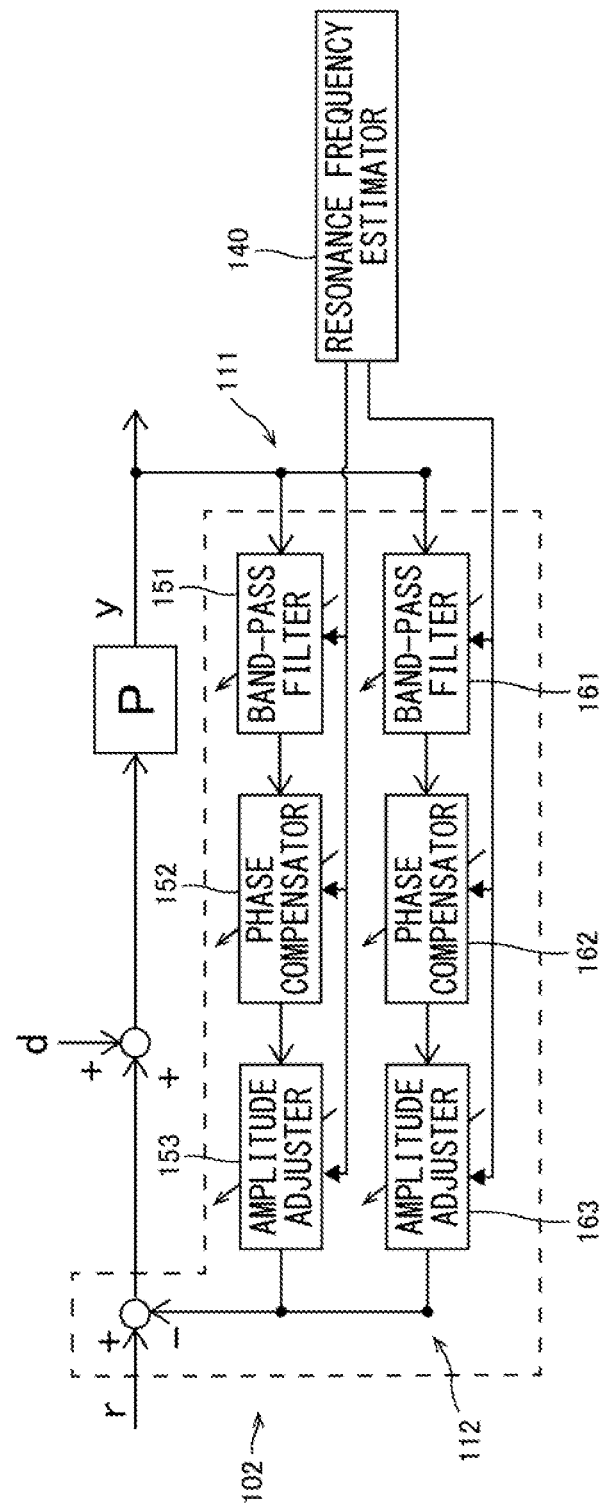
FIG. 8 is a functional block diagram illustrating a schematic configuration of a control device according to a second embodiment.

FIG. 8 is a functional block diagram illustrating a schematic configuration of a control device 102 (resonance suppression control device) according to a second embodiment. A configuration of this embodiment is different from the configuration of the first embodiment in that a resonance frequency in each vibration mode is estimated, and parameters of each of band-pass filters 151 and 161, phase compensators 152 and 162, and amplitude adjusters 153 and 163 of a plurality of feedback loops 111 and 112 can be changed by using the estimation result. In the following description, components similar to those of the first embodiment are denoted by the same reference characters and will not be described again, and only components different from those of the first embodiment will be described.

As illustrated in FIG. 8, the control device 102 includes the plurality of feedback loops 111 and 112 and a resonance frequency estimator 140.

In a manner similar to the feedback loop 11 of the first embodiment, the feedback loop 111 includes the band-pass filter 151, the phase compensator 152, and the amplitude adjuster 153. In a manner similar to the feedback loop 12 of the first embodiment, the feedback loop 112 includes the band-pass filter 161, the phase compensator 162, and the amplitude adjuster 163.

The band-pass filter 151 of the feedback loop 111 has a configuration similar to that of the band-pass filter 161 of the feedback loop 112. The phase compensator 152 of the feedback loop 111 has a configuration similar to that of the phase compensator 162 of the feedback loop 112. The amplitude adjuster 153 of the feedback loop 111 has a configuration similar to that of the amplitude adjuster 163 of the feedback loop 112.

The band-pass filters 151 and 161, the phase compensators 152 and 162, and the amplitude adjusters 153 and 163 have configurations similar to those of the band-pass filter 51, the phase compensator 52, and the amplitude adjuster 53 of the first embodiment except that the parameters are variable, which will be described later.

The band-pass filters 151 and 161, the phase compensators 152 and 162, and the amplitude adjusters 153 and 163 can change parameters in real time in accordance with a change of the resonance frequency of each vibration mode of the control target P. That is, in a case where the control target P has a configuration in which the resonance frequency varies during operation such as a robot arm or a crane or a case where the resonance frequency changes by, for example, deterioration with time, an individual difference in assembly accuracy, or nonlinear spring properties, components constituting the plurality of feedback loops 111 and 112 can change the parameters in real time in accordance with a change of the resonance frequency.

In the following description, the expression "can change in real time" means that parameters can be changed at a time at which vibrations in the changed resonance frequency can be effectively suppressed.

Specifically, the band-pass filters 151 and 161 can change a frequency of a pass band in real time in accordance with the resonance frequency. That is, the transfer characteristics of the band-pass filters 151 and 161 change by changing the center angular frequency ow in Equation (1) above. In Equation (1), the band-pass filters 151 and 161 may be configured to change in accordance with the resonance frequency.

The phase compensators 152 and 162 can change a phase of a predetermined frequency in real time in accordance with the resonance frequency. The transfer characteristics of the phase compensator 152 change by updating T1 and T2 in Equation (2) above. Accordingly, the phase compensators 152 and 162 of the plurality of feedback loops 111 and 112 can adjust the phase of the vibration suppressing signal in resonance frequency of each vibration mode.

The amplitude adjusters 153 and 163 can change a gain of the predetermined frequency in real time in accordance with the resonance frequency. The amplitude adjusters 153 and 163 changes a gain of an amplitude to be adjusted in accordance with the changed resonance frequency.

The predetermined frequency is a frequency of a signal that was generated in the feedback loops 111 and 112 and has passed through band-pass filters 151 and 161.

The resonance frequency estimator 140 estimates a resonance frequency by using a signal output from the band-pass filter 151. The resonance frequency estimated by the resonance frequency estimator 140 is used for changing the parameters of each of the band-pass filter 151, the phase compensator 152, and the amplitude adjuster 153. That is, each of the band-pass filter 151, the phase compensator 152, and the amplitude adjuster 153 has a parameter that is variable in real time in accordance with the resonance frequency estimated by the resonance frequency estimator 140.

Similarly, the resonance frequency estimator 140 estimates a resonance frequency by using a signal output from the band-pass filter 161. The resonance frequency estimated by the resonance frequency estimator 140 is used for changing the parameter of each of the band-pass filter 161, the phase compensator 162, and the amplitude adjuster 163.

That is, each of the band-pass filter 161, the phase compensator 162, and the amplitude adjuster 163 has a parameter that is variable in real time in accordance with the resonance frequency estimated by the resonance frequency estimator 140.

The resonance frequency estimator 140 may estimate the resonance frequency by any method as long as a resonance frequency such as FFT conversion can be estimated.

Accordingly, the parameter of each of the band-pass filter 151, the phase compensator 152, and the amplitude adjuster 153 can be changed in accordance with an estimation result of the resonance frequency in each vibration mode of the control target P. Similarly, the parameter of each of the band-pass filter 161, the phase compensator 162, and the amplitude adjuster 163 can be changed in accordance with an estimation result of the resonance frequency in each vibration mode of the control target P.

Thus, even in the case where the resonance frequency in each vibration mode of the control target P changes, the control device 102 can suppress vibrations by using the resonance frequency changed in each vibration mode of the control target P.

Advantages of the embodiment as described above were confirmed as follows.

A simulation model similar to that of the first embodiment was created by using a three-mass point model similar to that of the first embodiment. In a manner similar to the first embodiment, a time response in a case where white noise was input to the created model was obtained. As in the first embodiment, it was additionally confirmed that a resonance frequency of the three-mass point model changed by a time change of a spring constant of the three-mass point model.

Figure 9:
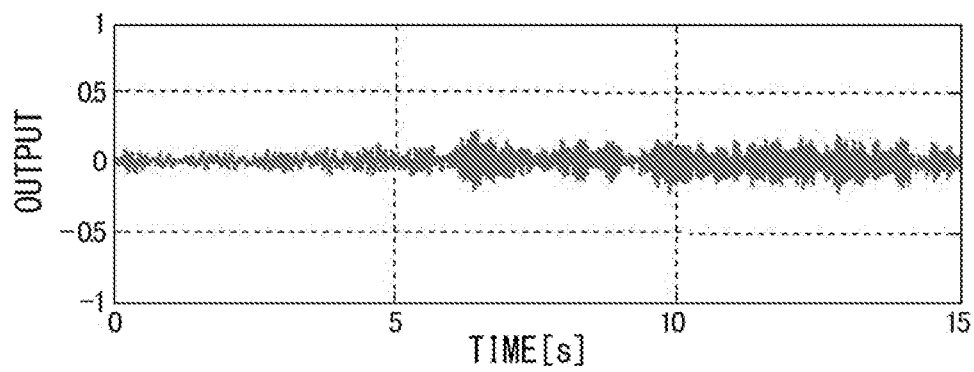
FIG. 9 shows a result of a time response in a case where vibration suppression control according to the second embodiment is performed.

FIG. 9 is a graph showing an example of a time response in a case where vibration suppression control of this embodiment is performed. As shown in FIG. 9, the vibration suppression control of this embodiment enables suppression of vibrations by resonance more effectively than the result shown in FIG. 6. In addition, since vibrations can be suppressed in accordance with the change of the resonance frequency by the vibration suppression control of this embodiment, vibrations can be more effectively suppressed than the advantages of the first embodiment shown in FIG. 7.

Other Embodiments

The embodiments of the present teaching have been described above, but the above embodiments are merely examples for carrying out the invention. Thus, the invention is not limited to the embodiments, and the embodiments may be modified as necessary within a range not departing from the gist of the invention.

In the embodiments described above, each of the control devices 2 and 102 has two feedback loops. Alternatively, the control device may include three or more feedback loops.

In the embodiments, the control devices 2 and 102 may perform other control such as servo control or feedforward control. The control devices 2 and 102 may perform dead time control, for example.

In the embodiments, the control target P includes the motor driving circuit 3, the electric motor 4, and the torque detector 5. Alternatively, the control target may include other configurations, or may include a shaft system having another configuration.

In the embodiments, the feedback loops 11, 12, 111, and 112 of the control devices 2 and 102 include the band-pass filters 51, 61, 151, and 161, the phase compensators 52, 62, 152, and 162, and the amplitude adjusters 53, 63, 153, and 163. Alternatively, the feedback loop of the control device may include another configuration.

In the second embodiment, the control device 102 changes the parameter of each of the band-pass filter 151, the phase compensator 152, and the amplitude adjuster 153 in accordance with a change of the resonance frequency. Alternatively, the control device may change the parameter(s) of one or two of the band-pass filter, the phase compensator, and the amplitude adjuster in accordance with the change of the resonance frequency. That is, the control device may change the parameter of at least one of the band-pass filter, the phase compensator, or the amplitude adjuster in accordance with the change of the resonance frequency.

INDUSTRIAL APPLICABILITY

The present teaching is applicable to a resonance suppression control device that suppresses vibrations in a resonance frequency of a control target.

REFERENCE SIGNS LIST 1 test device
2, 102 control device (resonance suppression control device)
3 motor driving circuit
4 electric motor
5 torque detector
11, 12, 111, 112 feedback loop
51, 61, 151, 161 band-pass filter
52, 62, 152, 162 phase compensator
53, 63, 153, 163 amplitude adjuster
140 resonance frequency estimator
P control target
M test specimen

The invention claimed is:

1. A resonance suppression control device configured to control suppression of vibrations in a resonance frequency of a control target, the resonance suppression control device comprising:
   a plurality of feedback loops configured to provide negative feedback of an output of the control target to an input side in accordance with a plurality of vibration modes of the control target, wherein
   each of the plurality of feedback loops includes a band-pass filter, a phase compensator, and an amplitude adjuster, the band-pass filter being configured to extract one or more vibration modes from the plurality of vibration modes,
   the band-pass filter and the phase compensator function as differentiators, and
   at least one of the band-pass filter, the phase compensator, or the amplitude adjuster includes a parameter that is variable in accordance with the resonance frequency.

2. The resonance suppression control device according to claim 1, wherein
   the band-pass filter is configured to change a frequency in a pass band in accordance with the resonance frequency,
   the phase compensator is configured to change a phase of a predetermined frequency in accordance with the resonance frequency, and
   the amplitude adjuster is configured to change a gain of the predetermined frequency in accordance with the resonance frequency.

3. A resonance suppression control device configured to control suppression of vibrations in a resonance frequency of a control target, the resonance suppression control device comprising:
- a plurality of feedback loops configured to provide negative feedback of an output of the control target to an input side in accordance with a plurality of vibration modes of the control target; and
- a resonance frequency estimator configured to estimate a resonance frequency of each of the plurality of vibration modes, wherein
- each of the plurality of feedback loops includes a band-pass filter, a phase compensator, and an amplitude adjuster, the band-pass filter being configured to extract one or more vibration modes from the plurality of vibration modes,
- the band-pass filter and the phase compensator function as differentiators, and
- at least one of the band-pass filter, the phase compensator, or the amplitude adjuster includes a parameter that is variable in accordance with the resonance frequency estimated by the resonance frequency estimator.

4. The resonance suppression control device according to claim 3, wherein
- the band-pass filter is configured to change a frequency in a pass band in accordance with the resonance frequency,
- the phase compensator is configured to change a phase of a predetermined frequency in accordance with the resonance frequency, and
- the amplitude adjuster is configured to change a gain of the predetermined frequency in accordance with the resonance frequency.

* * * * *